United States Patent Office 2,971,084
Patented Feb. 7, 1961

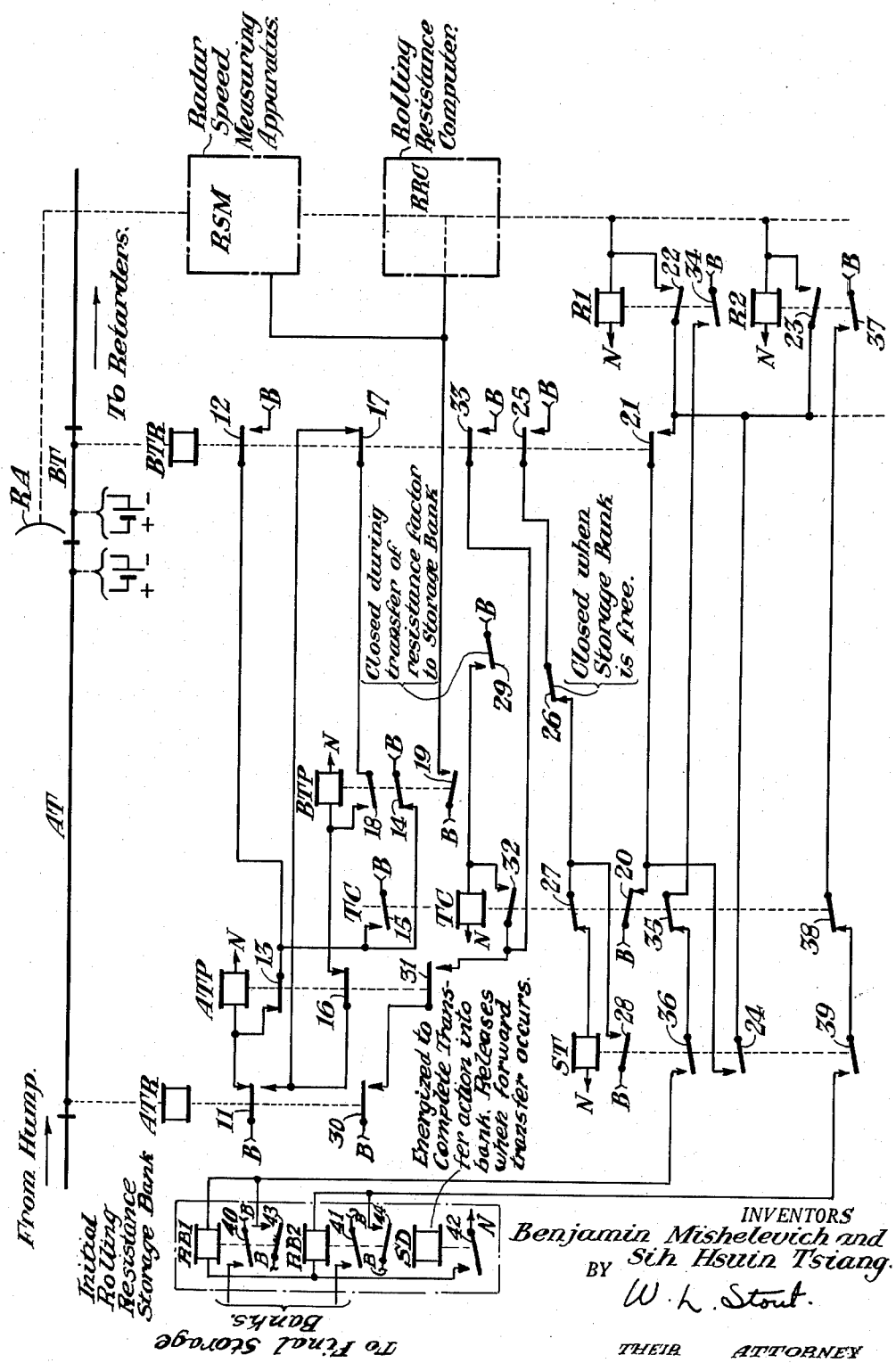

2,971,084
CONTROL CIRCUIT ARRANGEMENT FOR SPEED MEASURING APPARATUS

Benjamin Mishelevich and Sih Hsuin Tsiang, Pittsburgh, Pa., assignors to Westinghouse Air Brake Company, Wilmerding, Pa., a corporation of Pennsylvania Filed Feb. 14, 1956, Ser. No. 565,433

7 Claims. (Cl. 246—182)

Our invention pertains to a control circuit arrangement for speed measuring apparatus. More specifically, our invention relates to circuits for controlling the measurement of speed of successive railway cars in a classification yard.

It is the present practice in some railway classification yards to measure the speed and acceleration of the free-rolling cars as they move from the hump to the various storage tracks and to then convert this speed acceleration measurement into a rolling resistance measurement or factor which is used to control the car retarders, either through an automatic speed control system or by providing a visible indication to the operator who manually controls the car retarders. In railway yards where this rolling resistance measurement is taken, one problem is to get a sufficiently accurate measurement of the rolling resistance over a long enough period of time for each cut of cars to allow the variable factors to be averaged. In other words, the recording of the rolling resistance measurement must be postponed until the computing apparatus has had sufficient time to average the varying speed measurements to arrive at a reasonably correct measurement of the rolling resistance. A second problem which presents itself is the provision of independent measurements of the speed and thus the rolling resistance of closely following cuts of cars or individual cars. Unless these two problems can be met, the rolling resistance measurement is of little value to the automatic speed control system.

An object of our invention, therefore, is to provide an improved control for railway car speed measuring apparatus.

Another object of our invention is to provide an improved control arrangement for apparatus used to measure the rolling resistance of railway cars to allow sufficient averaging of the variable factors to arrive at a correct result.

Still another object of our invention is a provision of improved control circuits for rolling resistance measurement apparatus which delays the registration of the measured rolling resistance until the averaging of the variable factors is accomplished.

Still another object of our invention is to provide, in a system for measuring the rolling resistance of railway cars, improved control circuits which allow the variable factors influencing the rolling resistance of a car to be averaged by the measuring apparatus prior to the registration of the rolling resistance factor and yet allow for a similar measurement to be initiated for a closely following cut of cars in sufficient time.

Other objects and features of our invention will become apparent as the specification progresses.

In the practice of our invention we provide for the detection of each of the free-rolling cars as it moves through two relatively short sections of the railway track in the area over which the speed measurements are taken. The occupancy, by the railroad car, of the first of these two track sections opens the energizing circuit for a first repeater relay and closes the energizing circuit for a second repeater relay. The second repeater relay is then held in its energized condition until the car occupies the second track section. This second repeater relay is used to control the operation of the speed measuring apparatus and the energization of a series of rolling resistance register relays. These register relays are used to record the rolling resistance measurement made by the speed measuring and computer apparatus. While the car is traversing the first track section, the rolling resistance recorded in these registered relays, as they are controlled by the speed measuring apparatus, may be modified as the computer averages the variable factors involved. When the car occupies the second section, the rolling resistance then recorded in the register relays is made final by closing the stick circuits for these relays. The release of the second repeater relay when the second track section is occupied also halts the operation of the speed measuring and computer apparatus. The rolling resistance then registered in the register relay bank is transferred into a set of storage banks independent of the control circuits of our invention. However, only one transfer of a rolling resistance measurement is permitted for each car or multiple car cut. Then, if a following car occupies the first track section while the first car is still occupying the second section, the circuits of our invention operate to initiate a new speed measuring operation for the second cut of cars.

We shall now describe one form of apparatus embodying our invention and then point out the novel features thereof in the appended claims.

The single drawing is a diagrammatic view of the apparatus embodying one form of our invention when applied on the lead track in a railway classification yard.

Across the top of the drawing is shown, in a conventional manner, the stretch of track of this classification yard leading from the hump which is to the left of the drawing to the car retarders and the storage tracks to the right of the drawing. In other words, the free-rolling cars in this yard in traveling from the hump to the various storage tracks move along this stretch of lead track in the direction from left to right. This stretch of track is divided into two track sections designated by the reference characters AT and BT, respectively. Section BT is preferably relatively short when compared with section AT, for example, the relative lengths being on the order of 60 feet to 10 feet, respectively, for section AT and section BT.

Each section is provided with a track circuit which detects the occupancy of that particular section by railway cars. Each track circuit consists of the rails of the section set off from the rails of the remainder of the stretch of track by the usual insulated joints, a track battery, and a track relay. Each of the track relays is designated by a reference character similar to the reference character for the track section with the suffix letter R. Thus the track relay for section AT is relay ATR and the corresponding relay for section BT is relay BTR. The connections of the track batteries and the track relays to the rails of the corresponding section are shown conventionally as the detection of the cars is not specifically a part of our invention. It is to be understood that other means of detecting the presence of the railway cars at these track sections may be used. For example, the presence of the railway cars at the particular locations may be detected by the use of photocells or by track instruments which are operated by the wheels of the cars, such methods being well known in the art. As actually shown, each track relay is normally energized by the corresponding track battery when no car occupies that particular track section. Each track relay accordingly is deenergized when a car shunts the rails of its corresponding track section.

The apparatus in the drawing is supplied with a source of direct current power such as a battery. However, this battery is not shown as the use of such is conventional and only its positive and negative terminals are shown, designated by the reference characters B and N, respectively.

The apparatus shown in the drawing also includes two track repeater relays. The first of these, relay ATP, is normally energized by the direct current source over front contact 11 of track relay ATR. Relay ATP is provided with a multiplicity of stick circuits, the utility of which will appear as the specification progresses. A first of these stick circuits may be traced from terminal B over back contact 12 of relay BTR, front contact 13, and the winding of relay ATP to terminal N. The second and third paths of the stick circuit arrangement each also include front contact 13 of relay ATP and, respectively, back contact 14 of relay BTP or front contact 15 of a transfer control relay TC. The second repeater, relay BTP, is normally deenergized. Its energizing circuit may be traced from terminal B over back contact 11 of relay ATR, front contact 16 of relay ATP, and the winding of relay BTP to terminal N. This latter relay is also provided with a stick circuit which includes back contact 11 of relay ATR, front contact 17 of relay BTR, front contact 18, and the winding of relay BTP. It is obvious that this stick circuit, once relay BTP has been energized, is effective while section AT is occupied and section BT is clear of any railway cars.

In the specific showing in the drawing, a radar speed measuring apparatus RSM is provided to measure the speed of the railway cars moving through this stretch of track. This speed measuring apparatus is provided with an antenna RA located in the vicinity of the junction point between the two track sections. The speed measurement obtained by the radar apparatus is adapted by a rolling resistance computer RRC to provide the desired rolling resistance measurement. The specific details of this apparatus form no part of our particular invention. The radar apparatus with its accompanying antenna and the rolling resistance computer are therefore shown in a conventional manner by the dot-dash boxes at the right of the drawing and by the symbol adjacent to the track, such speed measuring and resistance computing equipment being well known to the art. It is to be noted that the supply of energy for the operation of this speed measuring and computing apparatus is controlled over front contact 19 of relay BTP in a manner which will be discussed shortly.

The rolling resistance of a car as computed by the unit RRC is registered in a series of relays forming a rolling resistance register relay bank of which only two register relays R1 and R2 are show. It is to be understood that a relay would be furnished for each degree of rolling resistance which it is desired to measure and record. These register relays are energized, in accordance with the measurement computed by unit RRC, by circuits extending from terminal B through front contact 19 of relay BTP, the circuits within unit RRC, and the windings of the register relays to terminal N. The connections through unit RRC and to the relay windings from that unit are shown in a conventional manner by dotted lines. Each of these register relays is also provided with a stick circuit. The circuit for relay R1 may be traced from terminal B over back contact 20 of a transfer control relay TC, back contact 21 of relay BTR, front contact 22 and the winding of relay R1 to terminal N. A similar stick circuit may be traced for relay R2 except for including front contact 23 and the winding of relay R2 in place of front contact 22 and the winding of relay R1. A front contact 24 of a storage transfer relay ST is effective at times to by-pass back contact 21 in these stick circuits for the register relays, as will be discussed more fully hereinafter.

When the rolling resistance information for a particular cut of cars has been recorded in the register relay bank, it must then be transferred to storage banks for use in the complete speed control system provided for that classification yard.

At the left of the drawing is shown a portion of the initial rolling resistance storage bank. As conventionally shown within the dot-dash rectangle, the bank is provided with two storage relays RB1 and RB2, corresponding to register relays R1 and R2, respectively. This initial storage bank may be provided with a storage relay for each degree of rolling resistance, that is, with a storage relay corresponding to each register relay. Preferably, the initial bank is provided with fewer relays and the degree of rolling resistance is indicated by the energized combination of the relays. For purposes of simplifying the present description, since the actual storage of the measurement does not enter into our invention, relays RB1 and RB2 will be considered to correspond directly to relays R1 and R2. The initial bank is also provided with a storage detector relay SD, of which only the winding is shown. It is sufficient to understand that relay SD is energized when all conditions are fulfilled for properly transferring information into this bank. Upon energization, relay SD completes the transfer circuits described shortly and remains energized to hold the information stored in the bank. When the information is finally transferred forward to final storage banks, as explained in the following paragraph, relay SD is deenergized and releases.

From this initial storage bank, a particular rolling resistance measurement is transferred forward through a series of storage banks for direct use in the retarder speed control system. This transfer action may be independent from bank to bank in the manner taught for the route transfer action by the copending application for Letters Patent of the United States, Serial No. 592,198, filed June 18, 1956 by John R. George and Sih Hsuin Tsiang for Automatic Control of Railway Classification Yard Track Switches, now Patent No. 2,863,992, issued December 9, 1958. Alternately, the rolling resistance factor may be joined, in a succeeding storage bank, with other control information and joint transfer accomplished in the manner shown by the copending application for Letters Patent of the United States, Serial No. 493,902, filed March 14, 1955 by Benjamin Mishelevich for Railway Car Retarder Speed Control Apparatus. Both of these reference applications and the present application are of common ownership. The exact manner of operation beyond the initial storage bank forms no part of our invention and thus is not shown. Reference to the cited art and to other known systems, together with the portion of the initial storage bank shown, will enable those familiar with automatic operation in classification yards to understand the transfer arrangements which may be used to provide the desired control. Whatever the system used, the information transferred forward will be determined by the energized condition of the initial storage relays, as indicated by the position of their front contacts, such as, for example, contacts 40 and 41 of relays RB1 and RB2, respectively.

The transfer action from the registry bank to the initial storage bank is initiated by the energization of storage transfer relay ST. Relay ST is energized when the second track section is occupied resulting in the release of relay BTR. This circuit may be traced from terminal B at back contact 25 of relay BTR over a contact 26 which is closed only when the initial storage bank is free of any previous storage, back contact 27 of relay TC, and the winding of relay ST to terminal N. When relay ST picks up, it completes, at its own front contact 28, a stick circuit which includes back contact 27 of relay TC. Contact 26 may be controlled by relay SD either directly or through intervening controls, so as to be closed when relay SD is released. A fuller description of the method of controlling the transfer relays may be had by reference to the previously mentioned Patent No. 2,863,992.

The system of our invention also provides the previously mentioned transfer control relay TC which is utilized to assure that only one transfer of rolling resistance information can occur for each cut of cars moving over the stretch of railway track. Relay TC is energized by the local source over a contact 29 which is closed only during the actual transfer of a resistance measurement from the register relays to the initial storage bank. This contact, for example, may be controlled jointly by relays ST and SD so as to be closed when both relays are picked up. In other words, contact 29 becomes closed as soon as the conditions are established to effect a transfer of a rolling resistance measurement from the register relays to the storage bank and opens as soon as the transfer is completed. Relay TC is provided with two stick circuits, the first of which may be traced from terminal B over back contact 30 of relay ATR, back contact 31 of relay ATP, front contact 32 and the winding of relay TC to terminal N. The second stick circuit includes back contact 33 of relay BTR and front contact 32 of relay TC.

A rolling resistance measurement recorded in the register relays is transferred to the initial storage bank over circuits controlled by relays ST and TC. For example, if relay R1 is energized to record a first degree of rolling resistance, this measurement may be transferred to relay RB1 of the storage bank over a circuit including front contact 34 of relay R1, back contact 35 of relay TC, front contact 36 of relay ST, the winding of relay RB1, and front contact 42 of relay SD. A second degree rolling resistance measurement is transferred to the storage bank over the circuit including front contact 37 of relay R2, back contact 38 of relay TC, front contact 39 of relay ST, the winding of relay RB2, and front contact 42 of relay SD. Relays RB1 and RB2, when energized, pick up to close front contacts, completing stick circuits including front contact 42 of relay SD and, respectively, front contacts 43 and 44. These stick circuits obviously hold the stored information until completion of a forward transfer which causes the release of relay SD and thus the opening of its front contact 42.

We shall now describe the operation of the system of our invention to control the measurement of the rolling resistance of successive cuts of cars moving over the stretch of track shown. We shall assume first that a car moving from the hump enters track section AT. Shunting of the rails of section AT deenergizes track relay ATR resulting in its immediate release. Although the normal energizing circuit for relay ATP is thus opened at front contact 11 of relay ATR, relay ATP remains energized over back contact 14 of relay BTP at the present time. The closing of back contact 11 of relay ATR completes the previously traced energizing circuit, including front contact 16 of relay ATP, for relay BTP which then picks up. The opening of back contact 14 of relay BTP then deenergizes relay ATP since the remaining paths of the stick circuit for this latter relay are open at the present time. Relay BTP also completes at its own front contact 18 the stick circuit previously traced which holds this relay energized until track section BT is occupied. When relay BTP picks up to close its contact 19, energy is supplied to units RSM and RRC to initiate the measurement of the rolling resistance of that particular car. This measurement begins immediately and continues as the car moves through track section AT. The register relays are thus supplied with current as previously described during this interval so that they may be energized in accordance with the rolling resistance computed by unit RRC. However, since relay BTR is still energized, the stick circuits for the register relays are not at this time complete, being open at back contact 21 of relay BTR and front contact 24 of relay ST. Thus, the rolling resistance measurement for this car may be modified as is appropriate during the entire period that it is passing through track section AT.

When this first car occupies second track section BT, relay BTR is deenergized by the shunting of the rails of the section and releases. The opening of front contact 17 of relay BTR deenergizes relay BTP and this latter relay releases to halt the measurement of the rolling resistance. Relay BTR closes its back contact 21 to complete the stick circuit for the register relay or relays then energized, thus recording the final measurement of the average rolling resistance as computed for this car during its entire passage through section AT.

Assuming that the initial storage bank is empty so that contact 26 is closed, release of relay BTR to close its back contact 25 completes the previously traced energizing circuit for relay ST, which picks up to complete its own stick circuit so that it is held energized until the transfer is complete. Assuming relay SD now energized, the circuits are complete for transferring the recorded rolling resistance measurement from the register relays to the storage relays of the initial storage bank in a manner that has been previously described. During this transfer, relay TC is energized, by the closing of contact 29 and picks up, completing at least one of its previously traced stick circuits. The opening of back contact 20 of relay TC interrupts the stick circuit for the energized register relay which then releases. The opening of back contacts 35 and 38 of relay TC interrupts the transfer circuits so that no other rolling resistance measurement may be transferred into the initial storage bank while this car occupies the measuring stretch. The opening of back contact 27 of relay TC interrupts the stick circuit for relay ST which then releases. Since back contact 27 also interrupts the energizing circuit for relay ST, the transfer of information into the initial storage bank is thus further prevented.

When the railway car completely clears track section AT, relay ATR is reenergized through the track circuit and picks up followed by relay ATP. Although this opens one of the stick circuits for relay TC, this latter relay remains held up over its second stick circuit closed at back contact 33 of relay BTR. With relay TC picked up, the third stick circuit for relay ATP is also completed at this time at front contact 15 of relay TC. In other words, at this instant, all three stick circuits for relay ATP are completed as soon as this latter relay picks up to close its front contact 13. This third stick circuit assures that relay TC releases before a second release of relay ATP, as will be discussed in the following paragraphs.

Let us assume that a second car now enters track section AT, shunting the track circuit of this section to again cause the release of relay ATR. Again, release of contact 11 of relay ATR energizes relay BTP as previously described. However, in this case, relay ATP is held energized by its stick circuit completed at either back contact 12 of relay BTR or front contact 15 of relay TC. With relay ATP holding up, relay BTP is also held energized even though its stick circuit is open at front contact 17 of relay BTR. As described previously, relay BTP, upon closing its front contacts, controls the speed measuring apparatus RSM and the computer RRC to measure the speed and the rolling resistance of this second car moving through the stretch of track. The stick circuits for the register relays are presently open at back contact 20 of relay TC, so that the rolling resistance measurement is again averaged according to the variable factors involved as this second car moves through section AT.

As soon as the first or leading car clears track section BT, relay BTR is reenergized and picks up. This opens the stick circuit for relay TC which releases shortly. The opening of front contact 15 of relay TC now deenergizes relay ATP, since back contact 12 of relay BTR is already open, and relay ATP releases. The opening of front contact 16 of relay ATP interrupts the pickup circuit for relay BTP but, prior to this, the stick circuit for this latter relay has been completed at front contact 17 of relay BTR so that relay BTP remains energized and keeps its front contacts closed. The operation of the system to complete the measurement of the rolling resistance of this second or following car and the recording of the measured rolling resistance in the register relays continues in a manner exactly as described before. In other words, the rolling resistance continues to be measured and computed according to the varying factors until this second car occupies track section BT.

It is to be noted at this point that if, during the previously described transfer of a rolling resistance measurement from the register relay bank into the initial storage bank, the car whose rolling resistance measurement is being transferred clears track section BT, so that relay BTR picks up to open back contact 21 prior to the completion of the information transfer, the register relays remain energized since the stick circuit for these relays will remain completed at front contact 24 of relay ST. This latter relay, of course, remains energized until the transfer action is completed, which will be indicated by the energization of relay TC which picks up to interrupt the stick circuit for relay ST. This second stick circuit for the register relays is of utility in case the transfer of the information for a particular car cannot be initiated until that car is nearly clear of track section BT, the delay being due to the storage for the preceding car not clearing from the initial storage bank as rapidly as is to be normally expected.

It is to be seen, therefore, that the system of our invention thus provides for the measurement of the rolling resistance of a car or cut of cars and for the continuing of this resistance measurement for a sufficient period, that is, over a sufficient length of track, so that the variable factors involved in such a measurement may be sufficiently averaged to give a correct resistance reading. The resistance information is not recorded or transferred into the storage banks until this averaging is completed. The resultant rolling resistance information inserted into the storage banks for use in the automatic speed control system is thus sufficiently accurate that the control of the car retarders is improved, resulting in an increased efficiency in the operation of the entire yard and a considerable reduction in the damage to both the cars moving through the yard and to their contents. It is also to be seen that the resistance measurement for a following car may be initiated while the first car still occupies the second track section. This allows the similar rolling resistance measurement of the following car to also be averaged over relatively the same length of railroad track so that its measurement may also be correct. The entire system of our invention results in an efficient utilization of the radar speed measuring apparatus and the rolling resistance computers so that a multiplicity of this type of equipment, in order to provide correct measurements, is avoided.

Although we have herein described and shown but one form of apparatus embodying our invention, it is to be understood that modifications may be made therein within the scope of the appended claims without departing from the spirit and scope of our invention.

Having thus described our invention, what we claim is:

1. In combination with a speed measuring apparatus capable when energized of providing an average measurement as a car traverses a stretch of railway track which is divided into a first and a second section, a first detection means having connections to said first section for detecting the occupancy of that section by a car, a second detection means having connections to said second section for detecting the occupancy of that section by a car, a track repeater relay, a control circuit including a front contact of said repeater relay to energize said measuring apparatus, a first circuit means controlled jointly by said first and said second detection means for energizing said repeater relay while a first car occupies only said first section, and a second circuit means jointly controlled by said first and said second detection means for energizing said repeater relay if a second car occupies said first section while said first car occupies said second section.

2. In combination with a speed measuring apparatus capable when energized of providing an average measurement for a car traversing a stretch of track which is divided into a first and a second section, a first detection means having connections to said first section for detecting the occupancy of that section by a car, a second detection means having connections to said second section for detecting the occupancy of that section by a car, a first means jointly controlled by said first and said second detection means and having connections for energizing said measuring apparatus when a first car occupies only said first section, and a second means jointly controlled by said first and said second detection means and having the same connections for energizing said measuring apparatus when a second car occupies said first section while said first car still occupies said second section.

3. At a stretch of railway track divided into a first and a second section and over which cars move in order through said first and said second sections, the combination comprising, a speed measuring apparatus effective when energized to provide an average measurement for a car then traversing said stretch, a first detection means having connections to said first section for detecting the occupancy of that section by a car, a second detection means having connections to said second section for detecting the occupancy of that section by a car, an energizing circuit for said measuring apparatus including a normally open contact, a first means jointly controlled by said first and said second detection means and having connections for closing said contact when a first car occupies only said first section and for opening said contact when said first car enters said second section, and a second means jointly controlled by said first and said second detection means and having connections for reclosing said contact if a second car occupies said first section while said first car still occupies only said second section.

4. At a stretch of railway track divided into a first and a second section and over which cars move in order through said first and said second sections, the combination comprising, a speed measuring apparatus effective when energized to provide an average measurement for a car then traversing said stretch, a first track occupancy detector for said first section, a second track occupancy detector for said second section, an energizing circuit for said measuring apparatus including a normally open contact, a first control means jointly controlled by said first and said second detectors and having connections for closing said contact when a first car occupies only said first section and for reopening said contact when said first car enters said second section, a second control means jointly controlled by said first and said second detectors and having connections for reclosing said contact if a second car occupies said first section while said first car occupies only said second section, a bank of registry relays controlled by said apparatus when energized for receiving the average measurement and controlled by said second detector for recording and holding the existing average measurement when said second section is occupied by the corresponding car.

5. In combination with a speed measuring apparatus capable when energized of providing an average measurement as a car traverses a stretch of railway track which is divided into a first and a second section, a first detection means having connections to said first section and responsive to the occupancy thereof for opening first contacts and closing second contacts when a car occupies said first section, a second detection means having connections to said second section and responsive to the occupancy thereof for opening third contacts and closing fourth contacts when a car occupies said second section, a first relay and an energizing circuit therefor including a first contact, a second relay and an energizing circuit therefor including a second contact and a front contact of said first relay, a stick circuit network for said first relay including in multiple a back contact of said second relay and a fourth contact, a stick circuit network for said second relay including in series a second and a third contact, a control circuit including a front contact of said second relay to energize said speed measuring apparatus, a plurality of register relays controlled by said measuring apparatus for registering the average measurement while said measuring means is energized, a stick circuit network for said register relays including another fourth contact to record the existing average measurement registry when the corresponding car occupies said second section, a storage means for storing at times the recorded average measurement, and a transfer circuit means connected to said storage means and controlled jointly by a fourth contact and by front contacts of said register relays for transferring the recorded average measurement from said register relays to said storage means, and a contact controlled by said storage means to open during a registry transfer inserted in said register relay stick circuit network to deenergize the register relays to cancel the recorded average measurement.

6. At a stretch of railway track divided into a first and a second section and over which cars move through said first and said second sections in order, the combination comprising, a speed measuring apparatus effective when energized to measure the rolling resistance of a car traversing said stretch, a first track occupancy detector for said first section operable to a first and a second position as that section is unoccupied and occupied respectively, a second track occupancy detector for said second section operable to a first and a second position as that section is unoccupied and occupied respectively, a first repeater relay and an energizing circuit therefor including a first position contact of said first detector, a second repeater relay and an energizing circuit therefor including a second position contact of said first detector and a front contact of said first relay, a stick circuit for said first relay including in multiple a second position contact of said second detector and a back contact of said second relay, a stick circuit for said second relay including in series a second position contact of said first detector and a first position contact of said second detector, a control circuit to energize said measuring apparatus including a front contact of said second relay, a plurality of register relays one for each measured value of rolling resistance and an energizing circuit network therefor including a front contact of said second relay and circuit paths in multiple each including a register relay and completed one at a time by said apparatus in accordance with the measured rolling resistance value, and a stick circuit network for said register relays including a second position contact of said second detector.

7. At a stretch of railway track divided into a first and a second section and over which cars move through said first and said second section in order, the combination comprising, a speed measuring apparatus effective when energized to measure the rolling resistance of a car traversing said stretch, a first track occupancy detector for said first section operable to a first and a second position as that section is unoccupied and occupied respectively, a second track occupancy detector for said second section operable to a first and a second position as that section is unoccupied and occupied respectively, a first repeater relay and an energizing circuit therefor including a first position contact of said first detector, a second repeater relay and an energizing circuit therefor including a second position contact of said first detector and a front contact of said first repeater relay, a stick circuit network for said first repeater relay including in multiple a second position contact of said second detector and a back contact of said second repeater relay, a stick circuit for said second repeater relay including in series a second position contact of said first detector and a first position contact of said second detector, a control circuit including a front contact of said second repeater relay to energize said measuring apparatus, a plurality of register relays one for each value of rolling resistance and an energizing circuit network therefor including a front contact of said second repeater relay and a plurality of circuit paths one for each register relay and completed by said measuring apparatus in accordance with measured rolling resistance value, a plurality of storage relays, a transfer relay and an energizing circuit therefor including a second position contact of said second detector and a contact closed when all said storage relays are deenergized, a transfer circuit network including said storage relays and front contacts of said transfer relay and said register relays to energize said storage relays to receive the rolling resistance value recorded by said register relays, and a stick circuit network for said register relays including in multiple a second position contact of said second detector and a front contact of said transfer relay to record and hold the existing rolling resistance value when the corresponding car occupies said second section.

References Cited in the file of this patent

UNITED STATES PATENTS

| | | |
|---|---|---|
| 1,766,539 | Prescott | June 24, 1930 |
| 1,981,487 | Wherry | Nov. 20, 1934 |
| 2,047,679 | Faus | July 14, 1936 |
| 2,206,550 | Mordin | July 2, 1940 |
| 2,477,567 | Barker | Aug. 2, 1949 |
| 2,690,238 | Brixner | Sept. 28, 1954 |
| 2,700,728 | Brixner | Jan. 25, 1955 |